Jan. 21, 1964 J. F. PAULSEN 3,118,659
COMPRESSION SPRINGS MADE OF AN ELASTOMER
Filed Jan. 30, 1961 3 Sheets-Sheet 1
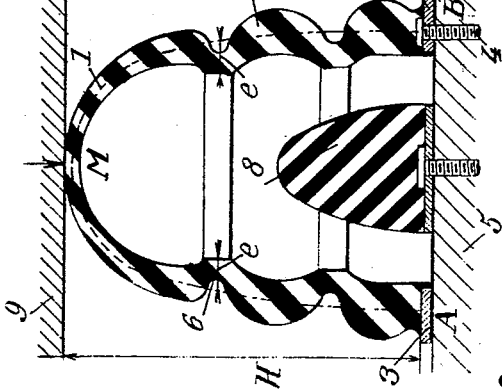
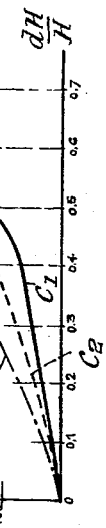
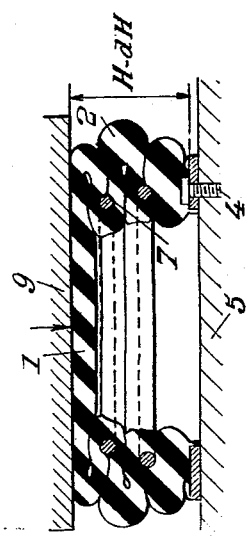
INVENTOR
Jean Felix Paulsen
BY
Larson and Taylor
ATTORNEY

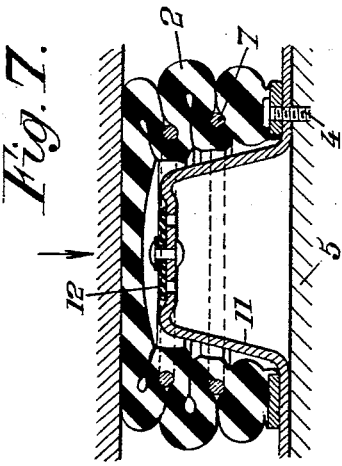
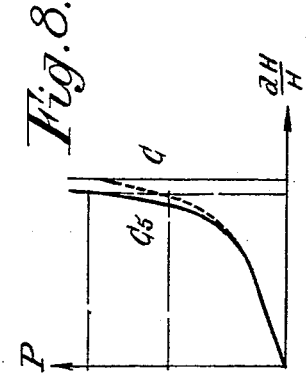
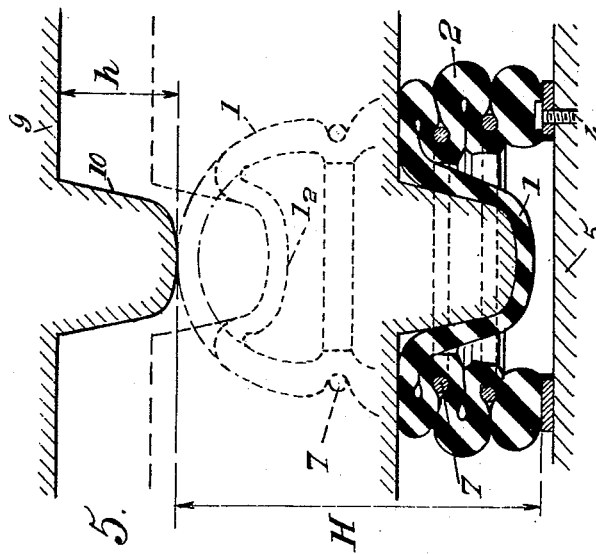
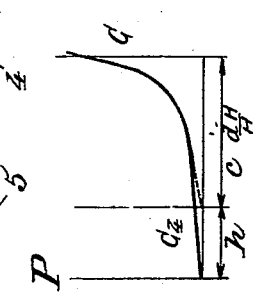

Jan. 21, 1964  J. F. PAULSEN  3,118,659
COMPRESSION SPRINGS MADE OF AN ELASTOMER
Filed Jan. 30, 1961  3 Sheets-Sheet 3

INVENTOR
Jean Felix Paulsen
BY
ATTORNEY

United States Patent Office 3,118,659
Patented Jan. 21, 1964

3,118,659
COMPRESSION SPRINGS MADE OF AN
ELASTOMER
Jean Félix Paulsen, Paris, France, assignor to Societe Luxembourgeoise de Brevets et de Participations, Luxembourg, a society of Luxembourg
Filed Jan. 30, 1961, Ser. No. 85,751
Claims priority, application France Feb. 9, 1960
5 Claims. (Cl. 267—35)

The present invention relates to compression springs made of rubber or an equivalent elastomer, in particular to springs for the suspension of vehicles.

The chief object of this invention is to provide a spring of this kind which is better adapted to meet the requirements of practice than those used up to this time, especially concerning its flexibility curve.

The invention consists in constituting at least partly the spring by a hollow body having the shape of a paraboloid or the like, that is to say comprising at least at one end thereof a kind of cap-shaped portion, the whole being such that the loads exerted on the spring have for their effect to produce two kinds of deformation, to wit, on the hand (preferably for low loads), a flattening of the cap-shaped portion and, on the other hand, a deformation of the whole of said body in the manner of a bellows.

Preferred embodiments of the present invention will be hereinafter described with reference to the appended drawings given merely by way of example and in which:

FIG. 1 is an axial section of a rubber compression spring made according to an embodiment of the invention.

FIG. 2 is a view similar to FIG. 1 showing another embodiment of such a spring.

FIG. 3 is an axial sectional view of the spring of FIG. 2 when deformed to the maximum degree under the effect of a load.

FIG. 4 shows the curves of operation of springs of this kind.

FIG. 5 similarly shows a spring of the same kind made according to still another embodiment of the invention and in different positions of operation.

FIG. 6 is a curve illustrating the operation of the spring of FIG. 5.

FIG. 7 is a sectional view of a spring of the same kind, in the crushed position, made according to still another embodiment of the invention.

FIG. 8 is a curve illustrating the operation of the spring of FIG. 7.

Figure 9:
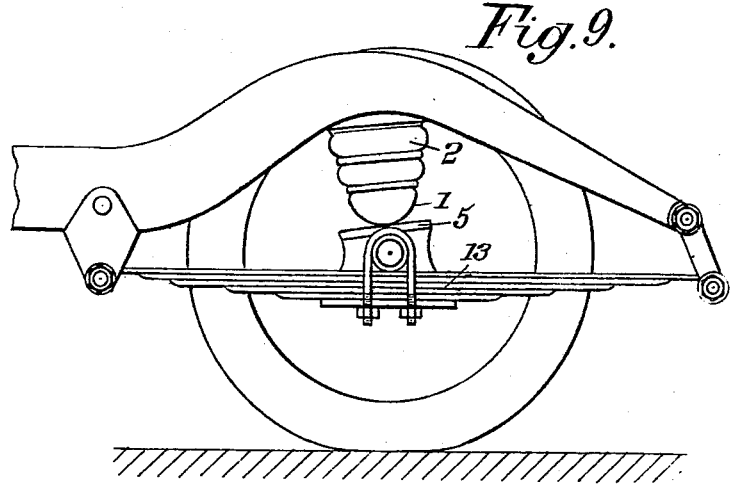

FIG. 9 is an elevational view of an automobile vehicle suspension in which a conventional spring and a spring according to the invention are combined together.

Figure 10:
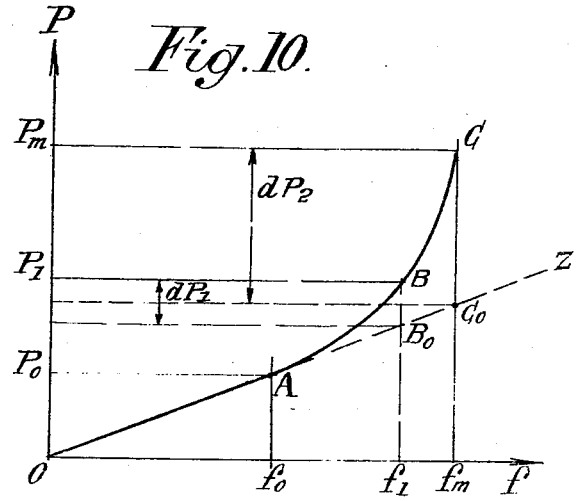

FIG. 10 is a diagram illustrating the operation of the suspension system of FIG. 9.

The invention will be described as applied to compression springs for the suspension of automobile vehicles, said springs being made of rubber or an equivalent elastomer.

A spring according to the present invention consists of a hollow body rounded at at least one end thereof, which is cap-shaped, the body having in longitudinal section a parabolic or similar shape and working in such manner that the application of loads to the spring produces, on the one hand (and preferably for low loads), a flattening of the cap-shaped portion and, on the other hand, a deformation of the whole of the spring in the manner of a bellows.

In order to obtain this last mentioned deformation, the wall of the spring body comprises annular portions of different sections. In other words this wall comprises suitable annular grooves and projections.

For instance, as diagrammatically shown by FIG. 1, a spring of this kind having for instance the general form of a body of revolution the axial section of which is of parabolic or analogous shape comprises the following elements:

On the one hand, a cap-shaped portion 1, the thickness of which is either constant or variable (for instance decreasing toward the top), and On the other hand, a hollow body 2 flaring toward the end opposed to the cap-shaped portion, this last-mentioned end being either open or closed, in particular being lined by a ring 3 of metal or another rigid material adapted to permit of fixing the springs at 4 on a structure 5.

The rubber or elastomer material forming the wall 2 of the spring body extends on both sides of a theoretical paraboloid AMB, in particular in the form of annular projections separated on the external side by grooves such as 6 opposite which the material has a smaller thickness $e$, it being understood that these thicknesses $e$ may be different for the respective grooves.

It should be well understood that the paroboloidal shape is given merely by way of illustration and that the body might consist of a frustrum of a cone covered by a spherical or similar cap-shaped portion.

Reinforcing rings 7 are advantageously engaged in the above-mentioned grooves so as to reinforce the body during the compression of the spring.

I may also provide a resilient cushioning device 8 acting as an abutment (FIG. 1).

Such a spring, when it is subjected to a load P either static or dynamic, tending to move support 5 toward a piece such as 9 (FIGS. 1 and 3), behaves for instance in such manner, if all is suitably calculated, that:

There is obtained a flattening of the cap-shaped portion (which comes for instance from 1 into $1_1$, FIG. 2, and then may be still further flattened), this first deformation taking place chiefly by a bending of the rubber and giving rise to rather small reactions and therefore to a great flexibility, Then a gradual flattening of the remainder of the body is obtained until the whole is crushed as shown by FIG. 3, the flexibility decreasing gradually and tending to become the smaller as the rubber material is deformed less and less by bending and more and more by compression.

FIG. 4 shows various flexibility curves wherein I have plotted in abscissas the rates of crushing $$\frac{dH}{H}$$

in the direction of the spring axis and in ordinates the loads.

Curve $C_1$ relates to a spring of the kind of that of FIG. 1 but without reinforcing rings 7 and with a relatively low hardness of the rubber material.

It will be seen that this curve $C_1$ comprises a first portion $c_1$ of high flexibility which corresponds chiefly to the flattening of cap-shaped portion 1. The slope of this curve then increases as the bellows forming a portion of the spring is more and more flattened or crushed. As a matter of fact it will be seen that for a degree of crushing of for instance 60% the curve has an anomaly at $C_{10}$. This means that the bellows, due to a defect in the guiding thereof, deforms in an irregular manner which therefore limits the maximum possible load.

Curve $C_2$ corresponds to a spring of the same kind but having a higher initial hardness. There is still an anomaly at $C_{20}$.

Curve $C_3$ corresponds to a reinforced spring of the kind of that of FIGS. 2 and 3 the initial hardness being higher. Owing to the guiding ensured by the presence of the reinforcing rings there is no longer any anomaly so that it is possible to reach higher loads and rates of crushing. Of course, this is also true when the initial hardness is lower. The initial portions $c_3$ would then become analogous to portions $c_1$ and $c_2$ the maximum loads and rates of crushing remaining however higher.

In what precedes, with reference to FIGS. 1 to 4, it has been supposed that the flattening of cap-shaped portion 1 results from contact thereof with a surface 9 which is supposed to be substantially flat. But as a matter of fact this term "flattening" must be understood in its widest meaning. It would apply in particular to the case where the action of loads P would be exerted on the cap-shaped portion by a projection as illustrated by FIGS. 5 and 6.

In the construction of FIGS. 5 and 6 part 9 carries a downward projection 10 adapted to penetrate into cap-shaped portion 1 to deform it to give it the shape $1_2$ of FIG. 5.

If it is supposed that this projection 10 is of a height equal to $h$, the deflection curve obtained by means of a device of this kind is such as illustrated by FIG. 6. It will be seen that the projection of FIG. 10 has for its effect to increase the length of the first portion of the curve which becomes portion $c_4$. There is therefore obtained an increase of the initial flexibility.

Another embodiment illustrated by FIG. 7 consists in making use, inside the compression spring, of an air or gas pressure.

This FIG. 7 shows that the inside of the compression spring is gas-tight, with preferably a reduction of the volume of the compression chamber owing to the insertion of a piece such as 11 which projects into the inside of said chamber so that at the end of the deflection the volume of air has become very small and exerts a reaction tending to increase rigidity.

With a device of this kind and as shown by FIG. 8 the curve C of devices 1 to 4 is straightened at $C_5$.

It is of interest to provide a device for compensating air leaks, which device may consists of an inlet check valve 12 (FIG. 7).

Whatever be the particular construction of the springs according to the invention, it is advantageous to combine them with a conventional spring as shown by FIGS. 9 and 10.

FIG. 9 shows a conventional suspension system including a leaf spring 13, this suspension being combined with compression springs 1, 2 according to the invention.

In a combination of this kind it is possible to calculate the conventional spring 13 in such manner that it is more flexible than in ordinary practice, which permits of obtaining a total curve of flexibility of the kind of that of FIG. 10 that is to say a great initial flexibility, this flexibility decreasing gradually as the displacement increases.

On said FIG. 10 I have shown the loads P in ordinates and the displacements $f$ in abscissas.

For small displacements, that is to say displacements lower than $f_0$ springs 13 may act separately, that is to say without contact between piece 5 and cap-shaped portion 1. The curve of flexibility is therefore a straight line OA extending along line OZ.

When the loads or dynamic stresses increase from $P_0$ to $P_1$, there is obtained a curve such as AB instead of the curve $AB_0$ which would be normally obtained in the absence of the compression springs 1, 2.

This curve portion AB corresponds to a preponderating crushing of cap-shaped portion 1. It will be seen that for a displacement $f_1$ corresponding to point $B$o$B$ the corresponding static or dynamic load is increased by $dP_1$ as compared with a conventional suspension.

Finally, when the load further increases, the portion 2 of the compression spring is flattened which gives rise to the curve portion BC.

The maximum displacement $f_m$ corresponding to the maximum static of dynamic load $P_m$ corresponds to an increase $dP_2$ of the load, with respect to the conventional construction.

There is finally obtained a curve OAC having a high initial flexibility and a reduced flexibility for maximum loads or stresses.

Concerning the thickness of the wall of the spring according to this invention, both for cap-shaped portion 1 and extension 2 it can be calculated in the best possible conditions for the desired purpose.

However, some examples will hereinafter be given by way of indication:

As a rule, the thickness $e$ at the bottom of the grooves must have a value lower than one fifth of the diameter D between the groove bottoms (FIG. 1), values ranging from $\frac{1}{6}$ to $\frac{1}{8}$ being apparently advantageous. For the remainder, the proportions illustrated by the drawings seem to be advantageous but of course constitute only examples.

Springs made according to the invention have the following advantages:

The curves of flexibility are more advantageous than those obtained at the present time and the construction is very simple.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A compression spring interposed between two parallel parts movable with respect to one another in a direction perpendicular to the plane of said parts, said spring being made of a deformable elastomer material constituting the only solid spring material, said spring being in the form of a unitary hollow body, symmetrical about an axis parallel to the direction of movement, said body comprising a rounded unrecessed cap-shaped portion urging at its apex against one of said parts; and a bellows-shaped portion open at the end opposed to said cap-shaped portion and urging against the other of said parts and forming an extension of said cap-shaped portion, said cap-shaped portion tapering in thickness from its junction with the bellows-shaped portion to said apex, and said cap-shaped portion being less rigid than any part of said bellows-shaped portion in response to compression efforts in said direction, such that said cap-shaped portion is deformed upon movement of the one said part toward the other said part prior to deformation of said bellows-shaped portion.

2. A compression spring according to claim 1 in which said bellows-shaped portion is provided with annular grooves.

3. A compression spring according to claim 2 further comprising reinforcement rings along the bottoms of said grooves.

4. A compression spring according to claim 2 further comprising a projection rigid with said first mentioned part and in contact with said cap-shaped portion.

5. A compression spring according to claim 2 further comprising a resilient abutment carried by said second part and located inside said body, said abutment extending toward said cap-shaped portion.

References Cited in the file of this patent

UNITED STATES PATENTS

| | | |
|---|---|---|
| 57,377 | Randall | Aug. 21, 1866 |
| 2,447,712 | Nathan | Aug. 24, 1948 |
| 2,921,781 | Pemberton | Jan. 19, 1960 |

FOREIGN PATENTS

| | | |
|---|---|---|
| 294,216 | Italy | Mar. 15, 1932 |
| 531,245 | Italy | July 23, 1955 |
| 1,116,112 | France | May 4, 1956 |
| 1,237,211 | France | June 20, 1960 |
| 258,893 | Great Britain | Apr. 14, 1927 |
| 750,459 | Great Britain | June 13, 1956 |